United States Patent
Wallbom et al.

(10) Patent No.: US 9,552,669 B2
(45) Date of Patent: Jan. 24, 2017

(54) SYSTEM, APPARATUS, AND METHOD FOR UTILIZING GEOGRAPHIC INFORMATION SYSTEMS

(75) Inventors: Mark Wallbom, Ocoee, FL (US); Gary Young, El Paso, TX (US)

(73) Assignee: UNDERGROUND IMAGING TECHNOLOGIES, LLC, Latham, NY (US)

(*) Notice: Subject to any disclaimer, the term of this patent is extended or adjusted under 35 U.S.C. 154(b) by 170 days.

(21) Appl. No.: 13/224,887

(22) Filed: Sep. 2, 2011

(65) Prior Publication Data

US 2012/0127161 A1    May 24, 2012

Related U.S. Application Data

(60) Provisional application No. 61/379,609, filed on Sep. 2, 2010.

(51) Int. Cl.
G06T 17/05    (2011.01)
G06T 19/00    (2011.01)

(52) U.S. Cl.
CPC ............. G06T 17/05 (2013.01); G06T 19/006 (2013.01)

(58) Field of Classification Search
CPC .. G06T 17/05; G06T 19/006; H01L 31/03529; H01L 31/103; H01L 31/1185; Y02E 10/50
USPC ......................................................... 345/419
See application file for complete search history.

(56) References Cited

U.S. PATENT DOCUMENTS

| | | | |
|---|---|---|---|
| 6,327,533 B1 | 12/2001 | Chou | |
| 6,363,320 B1 | 3/2002 | Chou | |
| 6,710,741 B2 | 3/2004 | Tucker et al. | |
| 6,778,128 B2 | 8/2004 | Tucker et al. | |
| 6,798,379 B2 | 9/2004 | Tucker | |
| 6,956,524 B2 | 10/2005 | Tucker | |
| 7,065,446 B2 | 6/2006 | Chou | |
| 7,072,668 B2 | 7/2006 | Chou | |
| 7,202,801 B2 | 4/2007 | Chou | |
| 7,262,724 B2 | 8/2007 | Hughes | |
| 7,482,973 B2 | 1/2009 | Tucker | |
| 7,834,806 B2 | 11/2010 | Tucker | |
| 7,920,068 B2 | 4/2011 | Sawyer, Jr. et al. | |
| 7,978,129 B2 | 7/2011 | Sawyer | |
| 8,081,112 B2 | 12/2011 | Tucker et al. | |
| 8,144,058 B2 | 3/2012 | Sawyer, Jr. et al. | |
| 2002/0184235 A1* | 12/2002 | Young | G01V 1/00 |

(Continued)

OTHER PUBLICATIONS

Vassilios Vlahakis, et. al. Archeoguide: first results of an augmented reality, mobile computing system in cultural heritage sites, Proceedings of the 2001 conference on Virtual reality, archeology, and cultural heritage, p. 131-139, Nov. 28-30, 2001, Glyfada, Greece.*

(Continued)

*Primary Examiner* — Maurice L McDowell, Jr.

(74) *Attorney, Agent, or Firm* — Hollingsworth Davis, LLC

(57) ABSTRACT

One or more geographic limits of a view of a digital display device are determined based on a location and orientation of the digital display device. A least a location of a subsurface object within the view is determined, and a multi-dimensional first representation of the subsurface object is rendered in the view based on the location and depth such that the first representation indicates an actual location of the subsurface object within the view.

27 Claims, 9 Drawing Sheets

(56) References Cited

U.S. PATENT DOCUMENTS

| | | | |
|---|---|---|---|
| 2004/0117117 A1* | 6/2004 | Sohl et al. | 702/2 |
| 2004/0220731 A1 | 11/2004 | Tucker | |
| 2007/0027591 A1* | 2/2007 | Goldenberg | G06F 17/3087 701/23 |
| 2007/0216710 A1* | 9/2007 | Stevenson | G06T 15/30 345/622 |
| 2008/0125942 A1 | 5/2008 | Tucker | |
| 2008/0295010 A1 | 11/2008 | Bobbitt | |
| 2009/0063424 A1* | 3/2009 | Iwamura et al. | 707/3 |
| 2009/0312986 A1 | 12/2009 | Smith et al. | |
| 2010/0023303 A1 | 1/2010 | Smith et al. | |
| 2010/0030528 A1 | 2/2010 | Smith et al. | |
| 2010/0045517 A1 | 2/2010 | Tucker et al. | |
| 2010/0211354 A1* | 8/2010 | Park et al. | 702/165 |
| 2011/0018965 A1 | 1/2011 | Schad et al. | |
| 2011/0081894 A1 | 4/2011 | Shin et al. | |
| 2011/0163733 A1* | 7/2011 | Nelson et al. | 324/72 |
| 2011/0202277 A1* | 8/2011 | Haddad | 702/7 |
| 2012/0025975 A1* | 2/2012 | Richey | H04W 4/023 340/539.13 |
| 2012/0257785 A1* | 10/2012 | Narayan et al. | 382/100 |
| 2013/0084838 A1 | 4/2013 | Smith et al. | |

OTHER PUBLICATIONS

Veas, "Handheld Augmented Reality for underground infrastructure visualization", Article in Personal and Ubiquitous Computing • May 2009, (see figs. 1, 3-5, 6-8 and pp. 3-15).*

* cited by examiner

SYSTEM, APPARATUS, AND METHOD FOR UTILIZING GEOGRAPHIC INFORMATION SYSTEMS

RELATED PATENT DOCUMENTS

This application claims the benefit of Provisional Patent Application Ser. No. 61/379,609 filed on Sep. 2, 2010, to which priority is claimed under 35 U.S.C. §119(e), and which is incorporated herein by reference.

FIELD OF THE INVENTION

This invention relates in general to geographic information systems, and in particular to mobile devices utilizing geographic information data.

BACKGROUND

A geographic information system (GIS) may include any system that captures, stores, analyzes, manages, and presents data that are linked to location. One field of work where GIS data is useful is in various types of surveying. For example, construction surveying may involve staking out reference points on a piece of land that guide the construction of new structures such as roads or buildings. In such a case, it is important to accurately establish geographic reference points. Similarly, a land surveying may involve marking out the metes and bounds of a property based on a legal description, and legal issues may arise if construction results in unintended incursion across or near property lines.

Modern surveyors use sophisticated tools to determine accurate location of reference points on land and water, such as precision levels, theodolites, tribrachs, laser distance meters, etc. Some aspects of a project may be highly sensitive to the accuracy of reference points, and some of the reference points may have been defined by others. For example, it is usually important to accurately define the property boundaries to ensure that structures are not placed too close to property lines, and proper placement of the property lines require an accurate description of the boundaries (e.g., via a plat map or legal description) and correct interpretation of that description.

Similarly, a construction project may need to take into account any pre-existing subsurface structures. A project may need to hook up to a buried structure (e.g., running a new utility line) and/or may be need to excavate nearby to a known subsurface structure. In such a case, it is important the structure is not damaged by digging equipment. The location of those subsurface structures may have been mapped by other entities, and the accuracy of those mappings may at times be suspect.

It will be appreciated that there is benefit to providing access to GIS data to many individuals who may be involved in a project. For example, construction workers and supervisors may continually be on-site, and therefore may be the first to discover any errors in the survey and/or in data on which the survey was based. In some cases (e.g., breakage of a natural gas line), the consequences of such errors can be fatal. In other cases (e.g., location of a foundation too close to a property line) the results may be expensive to correct. Accordingly, there is a need to increase both the availability and ease of use of GIS data so that non-specialists can utilize this data in their day-to-day activities.

SUMMARY

The present disclosure relates to mobile geographic information data methods, systems, and apparatuses for utilizing mobile geographic information systems. In one embodiment, a method, apparatus, and/or computer-readable medium may facilitate determining one or more geographic limits of a view of a digital display device based on a location and orientation of the digital display device. At least a location of a subsurface object within the view is determined, and a multi-dimensional first representation of the subsurface object is rendered in the view based on the location such that the first representation indicates an actual below-ground location of the subsurface object within the view.

In more particular embodiments the multi-dimensional first representation may include a three-dimensional projection of the below-ground object onto a ground surface. In other particular embodiments, second location and geometry data is determined of a visible object that is within the geographic location limits and that is visible within the view. In such a case, a three-dimensional second representation of the visible object is rendered in the view based on the second location and geometry data such that the second representation is overlaid on the visible object within the view. Further, a correspondence between the second representation and the visible object may be determined, and a position error of the first representation may be corrected based on the correspondence. In other arrangements, geometry data of the subsurface object may be determined, and the multi-dimensional first representation includes a three-dimensional representation that is rendered based the geometry data.

In another variation, at least location and geometry data may be determined of a non-subsurface, second object that is within the geographic location limits but is not visible within the view. In this variation, a multi-dimensional second representation of the second object is rendered in the view based on the location and geometry data of the second object such that the second representation indicates an actual location of the second object within the view. In this variation, the second object may include one or more of a property boundary, a future construction boundary, and an excavation boundary. In other variations, the one or more geographic limits may include a boundary volume.

In other more particular embodiments, determining at least the location and the depth of the subsurface object within the view may include downloading geographic information describing the subsurface object from a network service. In such a case, an account may be established with the network service, and access to the geographic information may be governed based on terms of the account.

In another embodiment of the invention, a method, apparatus, and/or computer-readable medium may facilitate receiving, via a network interface, data describing a location and orientation of a digital display device associated with a selected client device. One or more geographic limits of a view of the digital display device are determined based on the location and the orientation of the digital display device. At least a location of a subsurface object within the view is determined, and a multi-dimensional, first representation of the subsurface object is prepared based on the location and depth. The first representation is capable of being rendered in the view to indicate the actual location of the subsurface object within the view. Data describing the first representation is sent to the selected client device via the network interface.

In one variation of this embodiment, an account is associated with the selected client device, and access to the geographic information is governed based on terms of the account. In another variation, the one or more geographic limits include a boundary volume.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention relates to rendering objects in a mobile display such that the location and geometry of the objects can be visually determined. The objects being represented in the display may be hidden (e.g., buried underground) or may be non-physical (e.g., property lines). The display of these objects may be used for purposes such as surveying, digging/drilling, construction, etc. Data that describes the location and shapes of the objects may be obtained from a centralized database and retrieved on demand, e.g., based on a location of the mobile display.

Modern mobile devices are small and relatively low-cost, yet are increasingly being equipped with powerful processors and a multitude of features. For example, the increasing availability of high speed data networks means that mobile devices can be connected to the Internet from nearly any location. Further, such devices now commonly include position sensors (e.g., Global Positioning Satellite receivers, accelerometers, compasses) that allow the devices to act, for example, as navigation instruments. These and other features of modern mobile devices may be used to provide geographic information as described hereinbelow.

Figure 1:
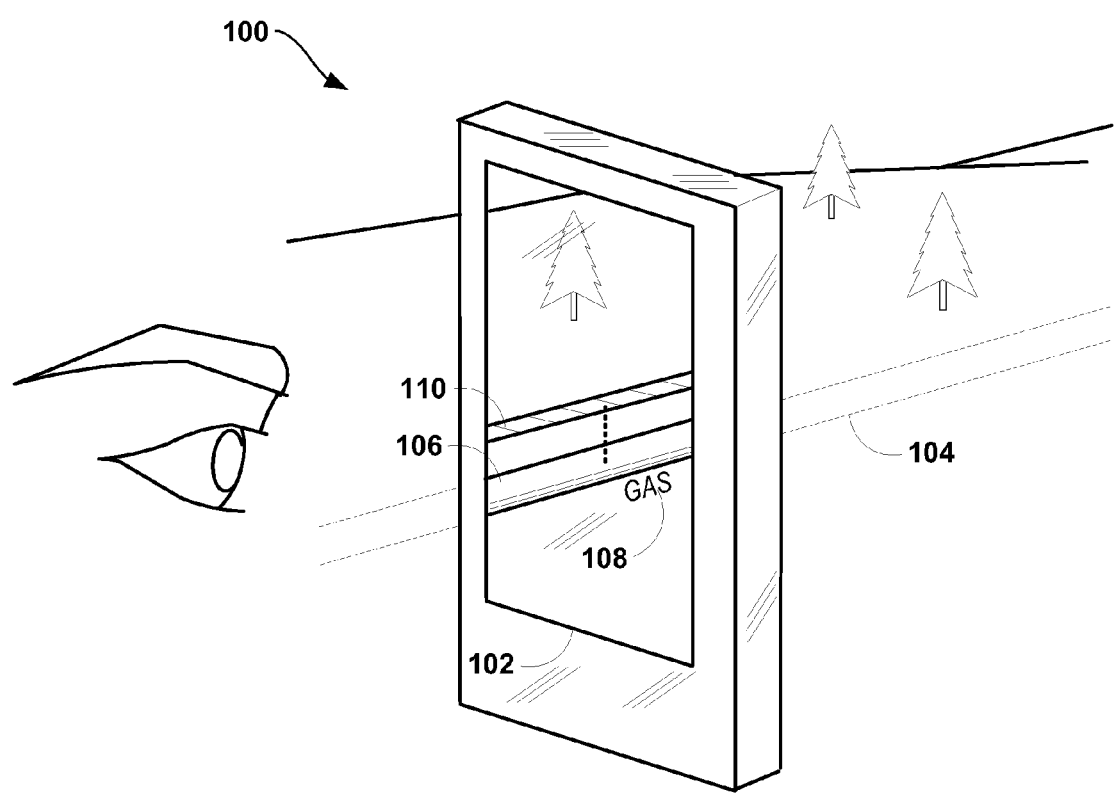
FIG. 1 is a perspective view of an apparatus according to an example embodiment of the invention.

Device 100 in FIG. 1 is presented as an example apparatus according to an embodiment of the invention. The device 100 may include at least a display 102 and position sensing hardware (not shown) that enables the device 100 to determine coordinates and/or orientation of the device 100. In the illustrated example, the device 100 may be used for a formal or informal survey, e.g., to determine the location of an underground pipe 104. The device 100 may access data describing the pipe 104 from a geographic information system (GIS) or geographic reference systems (GRS), which are known systems for characterizing the three-dimensional location of objects within a given volume of earth. Entities such as utility companies record locations of subsurface structures and objects so that such objects can be either found or avoided depending on the needs of those later accessing the data. This location and geometry data may be uploaded onto a GIS server, which may be accessible from private or public networks, including the Internet. Although various embodiments may be described herein as pertaining to underground structures, it will be appreciated that the concepts may be equally applicable to underwater structures.

Based on the GIS/GRS data and on the known location and orientation of the device 100, a virtual representation 106 of the pipe 104 may be placed on the display in the actual location relative to the display 102. The user may be able to point a device such as 100 at the ground and using simple range finder (e.g., parallax angle) technology be able to "see" what utilities are under foot along with other data related to the structures and surrounding property, e.g., ownership, easement lines, status, access points, etc. This virtual representation 106 may be accompanied by this and other displayed metadata, as represented by label 108.

In order to place the virtual representation 106 in its current context (e.g., within a scene shown in the display 102) the device 100 may include a camera (not shown) that provides a still or video picture on the display 102, and the virtual representation 106 is then overlaid with this context. In another variation, the display 102 may be transparent/translucent, such that the only the representation graphic 106 need be displayed. For example, the display 102 may use a technology that allows directly displaying images on a transparent screen, and/or use "heads-up" technology wherein images are projected at an off-view angle onto a see-through screen. It will be appreciated that in these and other arrangements, the user can move the device 100 to different vantage points, and the rendering of the virtual representation can be made to adjust accordingly. This can provide a dynamic, three-dimensional, virtual representation of the location and geometry of a target object. Further, this virtual representation may adjust in synchronization with changes in actual view (e.g., still photo or video) seen via the display 102.

In some arrangements, the device 100 may implement or interface with external, wearable, 3-D visualization hardware, such as glasses or goggles. Such visualization hardware may use passive optical features such as polarized lenses that interact with a specially formatted image on display 102. In other embodiments, the visualization hardware may include active displays that block or pass light in synchronization with an external display 102. Such active displays may also include projection features such that a 3-D image of virtual object can be simulated without the need for an external display, e.g., by directly projecting the images on a lens. For purposes of rendering the objects in such a display, the location and orientation of interest may of the goggles themselves. As such, the goggles may include sensors to provide some or all of the location and orientation data.

The virtual representation 106 may be shown as the actual object might be seen underground, e.g., with X-ray vision. However, in some instances the GIS/GRS data my not include depth information, thereby preventing an accurate depiction of the pipe 104 in this way. In such a case, the depiction may instead include a projection 110 of the pipe on the ground surface. This projection would itself be a 3-D object, as it could change shape/orientation in response to movement of the device, show perspective, etc. This projection 110 may be sufficient to enable placement of markers and other indicia to facilitate safe excavation and the like. Other geometric shapes may be used instead of or in addition to the projection 100 to indicate a 3-D "keep out area", such as a plane or volume (not shown) that is shown extending below the ground surface along the path of the projection 110.

In other arrangements, an estimation of depth may be used if shape 106 is still desired for rendering. For example, certain utilities may require objects to be placed at a minimum required depth. These requirements may be unique to a particular industry and/or area, but this may be derived based on the device's location and the type of object being viewed. In such a case, a "conservative" rendering of the graphic 106 may be placed at the minimum allowable depth. Such a rendering 106 may provide a sufficient factor of safety for certain activities, e.g., vertical drilling/digging Generally, device 100 may include any apparatus or combination of devices that are at least capable of detecting a current location of the user, and determining geographic location data of interest, e.g., locations of subsurface objects. For example, the device may be a Global Positioning Device (GPS) equipped smartphone that is capable of obtaining the geographic data on static, dynamic, and/or on-demand basis. In one example, this functionality could be provided in the form of an application that is downloaded and installed on the device 100. While in some embodiments, the device 100 may also include orientation sensors that determine an orientation of a camera and/or display, in some situations, not all of these sensors/devices may be needed.

For example, a user may install a "proximity detection" application in the device 100 that determines the user's current location and also obtains GIS data describing, e.g., subsurface objects such as utility lines, septic tanks, well heads, etc. This interaction may at least involve determining a proximity threshold between the user and subsurface objects, and alerting the user as to this proximity. In such a case, the device 100 may not need to visualize the data, but only indicate whether the user is currently located near subsurface structures and/or provide an indication of distance and direction to nearby subsurface structures.

The above-mentioned subsurface object GIS data may be streamed to the device 100 on an as-needed basis based on the device's present data (e.g., a predefined location, area, and/or volume box or sphere is used to determine and/or limit GIS data sent to the device 100). In other situations, a particular subset of subsurface object data may be preinstalled on the device 100, e.g., via a data cable or memory card. In yet other situations, the subsurface data may be entirely located at a remote server, and the device 100 interacts with the subsurface object data indirectly, e.g., by receiving alerts of interest relative to the user's current position as determined by the remote server.

The present example need not be limited to any particular mechanisms of how subsurface data is accessed/used, and it may be preferable that such details remain be invisible to the end user. The user may simply desire to activate the application while performing some work in which the subsurface data may be of interest, e.g., digging a trench using a motorized trencher. After activating the application, the user may need only to carry the device 100 while working, e.g., place the device 100 in his/her pocket. At some point when the user's current position (as measured via the device 100) approaches a predetermined distance from an underground object, the device 100 may alert the user through built in features of the device, e.g., vibration, ring tone, etc.

In one arrangement, the application may just alert the user to a potential for a problem, and the user may take it upon themselves to investigate further (e.g., check existing site markers and plans to determine a source of the trouble). In other cases, the device 100 may provide additional data in formats which may include, but are not limited to, text, voice synthesis, graphics, and the above described virtual overlays. For example, the user may be provided varying levels of detail depending on a level of service that the user has paid for. A server-generated alert may be free, but more detailed descriptions may only come via a paid service. For example, one level of paid service may enable receiving one- and/or two-dimensional graphics (e.g., points and/or lines/curves) of underground objects that may be overlaid on a custom or existing map service. In such a case, the two-dimensional maps with overlays may be viewed on the device 100, as well as an icon showing the user's present position. With a higher cost level of service, the user may be able to utilize a 3-D overlay with a camera/view as seen in FIG. 1.

It will be appreciated that the device 100 and associated software may facilitate accessing additional data besides location and geometry of subsurface objects. For example, metadata such as label 108 may be overlaid in a display or otherwise be associated with a graphical object (e.g., in response to selecting the object). Such metadata may include, but is not limited to, the type of object, owner, contact data, material, configuration (e.g., encased in a conduit), data installed/serviced, etc. This metadata may also be accessed via different software such as a web browser. The graphic 106 may act as a hyperlink that enables accessing this and other data via a browser when the graphic is selected.

Device 100 may be tailored for use in many situations. For example, a homeowner, planner, architect, or the like may wish to view a future construction site during an initial planning and/or request for quote (RFQ) stage of a project. While the user in this scenario may have access to maps of the site and related data, including property lines and utilities structures, an on-site evaluation can be particularly useful in planning stages, e.g., when considering aspects such as aesthetics or potential problems in using a site. In such case, having the ability to locate subsurface structures and property lines in a camera and/or map view may provide a much greater feel for difficulties or advantages in a particular approach if and when a more detailed design is prepared. In addition, such images can be captured (e.g., saved as digital media via device 100) and kept as part of project documentation.

Figure 2:
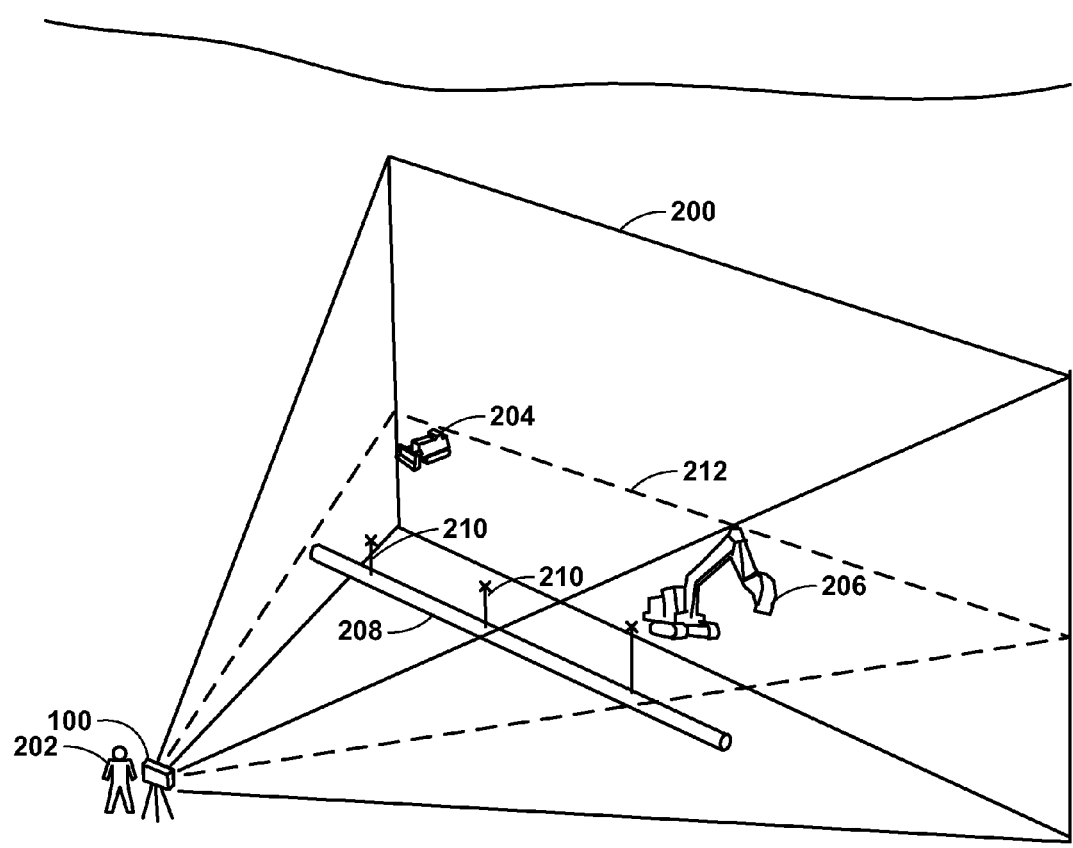
FIG. 2 is a diagram illustrating an example use of an apparatus according to an example embodiment of the invention.

In another scenario, a device 100 according to embodiments of the invention may be used during project construction, as is shown by way of example, in FIG. 2. In FIG. 2, an active construction site may be viewed via device 100, e.g., by a site foreman 202 or other individual who may be interested in overall aspects of a project. The project may include various pieces of construction equipment 204, 206 in operation at a given time. Further, there may be existing subsurface underground structures, as represented by virtual object 208. Other virtual objects (not shown) that may be displayed include property lines, planned geometry and location of excavations/structures, etc.

As seen in FIG. 2, device 100 may be set up to cover a wide area. Generally, the view of interest may be defined by a volume, here shown as a trapezoidal bounding volume 200. The extent of the volume 200 (e.g., distance of edge 200a from the device) may be bounded by user identity, system configuration, and/or other practical considerations. For example, even though data may be available that covers and area from the current location to the visible horizon, there may be a practical limit on an amount of data provided or presented, based on factors such as viewing resolution, data capacity, network bandwidth, etc.

As denoted by the broken line 212, the volume 200 may also encompass space below the surface. Therefore, using geometric principles known in the art, a representation of object 208 can be placed in a location (e.g., in a display or screen associated with device 100) that represents the object's actual location, e.g., as the object would be seen if surrounding soil were excavated. Or, if no depth information is available, the object 208 could be rendered as a projection onto the ground surface. In either case, the person 202 may be able to view, in real or near-real time, the actual equipment 204, 206 as it is interacting with nearby hidden/buried objects as represented by object 208.

Generally, it may be difficult in some cases to determine relative location of a virtual object 208 based on only a graphical depiction of the object via an apparatus. Such depiction may be lacking cues/references that enable the human eye to place objects within a scene. For example, a simple overlay of graphic 208 may not take into account factors such as foreground objects that would block or obscure the object, and variations in color due to distance from the viewer.

To better determine where the subsurface structure is relative to other reference points in the view, the representation 208 may include markers 210 that indicate the depth of the object 208 at a given point. Thus the "X" at the top of the marker would estimate a point on the ground surface directly above the buried object 208. In the case where depth information is not known/or estimated, the representation 208 itself would show the object as indicated by the "X." The device 100 may also be able to overlay other graphics that assist in relative location estimation, such as a grid estimating the current terrain map upon which the depth measurements are based. In another example, a graphic such as a vector/line could be displayed that show estimated distances between the object 208 and other objects of interested, e.g., equipment 204, 206.

It will be appreciated that, like device 100, equipment 204, 206 may include location position/sensors, cameras, displays and the like that may provide similar visualizations to the equipment operators. The equipment 204, 206 may include these components at multiple locations, such as in the cab, at the end of a digging tool, etc. The data from such sensors may be used by the individual equipment operations and any other entities of interest. Sensors installed in equipment 204, 206 may also be used to feed back data into the system, e.g., to register the location of newly installed structures, to provide geometry data that shows work progress, such as the current size of an excavation. This and other data may be collected and sent via a network to a centrally-accessible server for storing and maintaining GIS data.

A collection of GIS data for all past and future activities on a work site may be stored on a central GIS server. The entity that maintains the server may develop a certification program for other providers that would allow them to upload their data into the system. Such combined data could form a regional and/or national GIS system that can provide to any given operator a set of GIS data that that can be queried to determine data of interest. This data can be used for numerous purposes, such as providing real-time or near real-time-data that describes present construction activity. Such data may be provided on a paid basis, e.g., available to purchasers of certain equipment and/or available on a subscription basis to third parties.

In the above example, the organization may already have a number of mechanisms in place to prevent construction equipment from damaging underground utilities. Nonetheless, having additional, possibly redundant, measures in place may provide an additional factor of safety. For example, the equipment 204, 206 may have a visual overlay system that not only shows the operator a location of nearby hidden object, but alerts the operators about nearby objects that may or may not be in the operator's current view. Similarly, viewer 202 may be afforded a wide overall view of the entire site. In such a case, certain areas of the workplace may be flagged as being potentially risky, behind progress, etc. Such a quick assessment may be of use to a site supervisor, for example, to establish priorities and identify activities that may need extra attention.

Many variations on the above-described scenarios are possible. For example, instead of or in addition to the equipment 204, 206 having built-in location sensing, the device 100 may include a range-finding sensor (e.g., laser) that the operator 202 may be able to point at equipment 204, 206, or any other object or area. Such target data may be used to find potential conflicts such as the risk of damaging an underground structure, and/or may be added to the GIS data service as described above.

Figure 3:
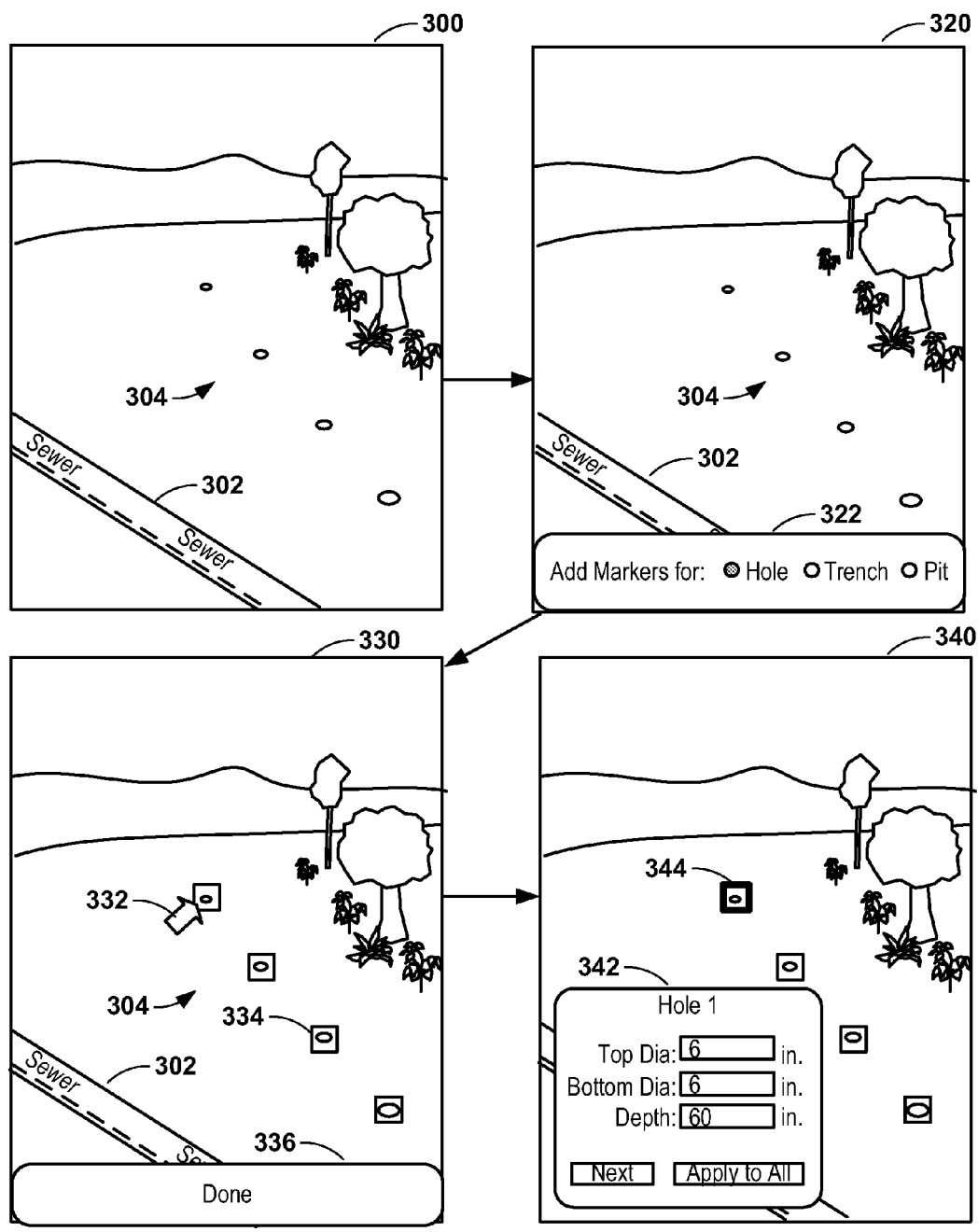
FIGS. 3-5 are diagrams illustrating user interface screens associated with an apparatus according to example embodiments of the invention.
Figure 4:
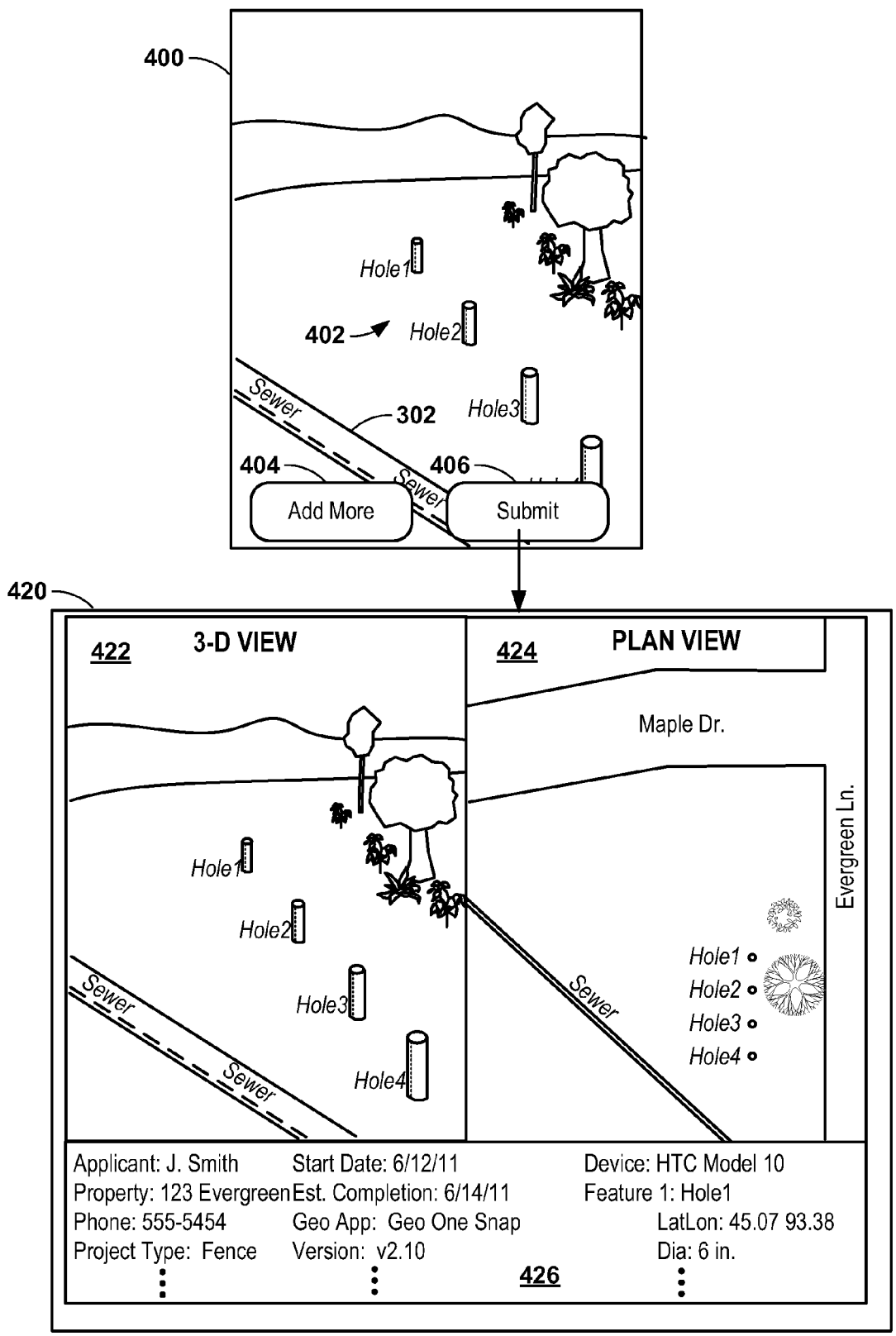

It will be appreciated that the present invention may be used with a wide variety of different devices. For example, an industrial-quality device capable of highly precise position measurement (e.g., within a centimeter) may be adaptable to integrate measured data with externally provided GIS data (e.g., via a network service). Such a device can be used to provide visual overlays as described above, either on the device itself or via an external device such as a laptop computer. The other end of the device spectrum includes consumer mobile devices that, while otherwise highly capable, may be much less accurate in determining position (e.g., within a meter). Such devices may still be quite usable in interacting with a GIS database in some cases. For example, FIGS. 3-4 illustrate an example scenario oriented for use by consumer devices according to an embodiment of the invention.

Generally, a software application that enables the described features can be distributed to a user via the Internet for installation and use on an appropriate personal device, e.g., a smart-phone having the requisite capabilities for capturing images, accessing a network, and determining location and orientation. In this example embodiment of the invention, this application may used for when an individual or business wishes to perform excavation and/or construction on a site. In many states, before performing such work, the individual or business must contact a "one-call" entity. This entity will send somebody to the site to mark out (e.g., using spray paint and/or flags) the location of unseen obstacles such as buried utility lines. This service may be provided for free to the individual, and may be required by law in order to protect underground facilities and the public at large.

It will be appreciated that, even though the individual may not have to pay for this service, some entity does have to pay for the service, e.g., the government may pay for the service by way of fees/taxes levied on utility individuals, companies, construction companies, etc. In order to reduce costs and/or delays incurred by sending an official service representative to a site, a user may be able to instead install a GIS visualization application according to an embodiment of the invention on the mobile device. Such an application may allow a user to visualize, e.g., underground objects such as sewer line 302 seen in screen 300 of FIG. 3, when a camera phone is pointed at an area of interest. The user, in the context of a one-call service, may need to be certified by the one-call entity to ensure compliance with one-call service requirements. This user, however, may be a contractor or licensed professional that is working at a job site, rather than a governmental (e.g., county) or utility representative, for example.

In this example, the user is installing a fence, and so may install markers 304 that define where post hole excavations (or similar activities of interest) will take place. The markers 304 (e.g., stones, stakes, paint) are placed on the ground so as to be visible to the camera. With just this view, the user may be able to determine there is sufficient clearance between the planned post holes and the nearest underground structure 302. However, depending on the user's location and other factors such as perspective and parallax, the amount of clearance may not be immediately clear. In such a case, the user may move to different locations, including directly over the markers 304 to determine the actual amount of estimated clearance.

Overlay views such as shown in screen 300 may be useful enough on their own for the user to be confident that, for example, the planned project will not conflict with any underground pipes or lines. However, it may be desirable to provide further documentation of the project via the application for the user's own benefit, and for that of other entities such as the local municipality. As seen in screen 320, the application may include a menu 322 that allows adding virtual markers that correspond to the physical markers 304. As seen in the menu 322, the markers may be added for different types of excavations, three of which (hole, trench, pit) are shown here by way of example.

After selecting the type of marker in menu 322, the application may enter a "drawing/input" mode as seen in screen 330. This allows the user to select (as represented by cursor 332) where on the display the markers 304 are located, by inputs to a touchscreen, keypad, joystick, etc., and/or by the use of automatic algorithms such as pattern recognition, proximity sensors, etc. In some cases, the device running the application may be moved to location of markers 304 and a button pressed to record the marked location location. In other cases, the device may utilize external measuring equipment such as a range finder to select the markers 304. For each marker 304, a shape such as square 334 may be shown indicating the selection of the marked item. A control 336 is selected to complete the drawing of elements and leave the input mode.

As seen in screen 340, a data entry mode may include menu 342 that allows entering other relevant data related to the inputs 334 from the previous screen 330. For example, data is input to the menu 342 describing a selected one 344 of the markers. This data may be auto-filled for the others of the markers, or the user may enter different data for each individual marker. This data may then be used to form additional virtual objects representing aspects of the planned project, which is seen in screen 400 of FIG. 4.

In screen 400, virtual objects 402 that represent the project excavations (e.g., post holes) are rendered. These objects 402 are rendered in the same 3-D space as, e.g., subsurface object 302 and/or surface projections thereof, so that by viewing the scene 400 from different viewing angles, any intersections/collisions between the excavation and underground structures can be observed. A control 404 allows adding additional virtual items, and another control 406 allows saving or submitting the project information.

In one scenario, the application shown in FIGS. 3-4 may be used as a substitute for a physical site inspection and marking that may be provided by a one-call service. In such a case, the information gathered by the application may be used to form a report 420 that is suitable for paper or electronic submission to an entity, such as a local municipality that would otherwise require the one-call service. The report 420 may be submitted directly via a mobile device using control such as 406 in screen 400. In other variations, the GIS data describing the existing and planned structures can be uploaded to a personal computer. In such a case, the data may be used for both generating the report 420, as well as other purposes, such as inputting the data to a computer aided drawing (CAD) program of the user.

The report 420 may include one or more 3-D views 422 that are captured on-site, e.g., from a mobile device camera, and overlaid with virtual objects as described above. From these views 422, two-dimensional plan views 424 may also be determined or derived, and may be combined with other mapping data. For example, the 2-D views 424 may have overlays for streets, property lines, subsurface structures, satellite photos, and other overlay data known in the art. The report may also include textual and metadata 426. This additional data 426 may include data that would be gathered by a one-call service (e.g., applicant's personal information, property location, etc.). The additional data 426 may also include other data, such as vendor of hardware and/or software, versions, and other data related to the application and hardware that generated at least the data seen in the 3-D view 422.

It will be appreciated that an application according to various embodiments described above may be adapted to a wide range of hardware. In some scenarios, the efficacy of such an application may depend on whether sufficiently accurate renderings and other outputs can be obtained using consumer-grade location measuring hardware. While inexpensive GPS receivers may provide accuracy sufficient enough for navigation and other known uses, it may not always be sufficiently accurate for other uses, such as locating an underground structure to accuracies of within a few inches. Further, while the 3-D visualizations described above may be intuitive and easy to understand for a novice, such visualization may not always be easily exploited for some purposes, such as placing stakes to mark out the location of an underground object.

Figure 5:
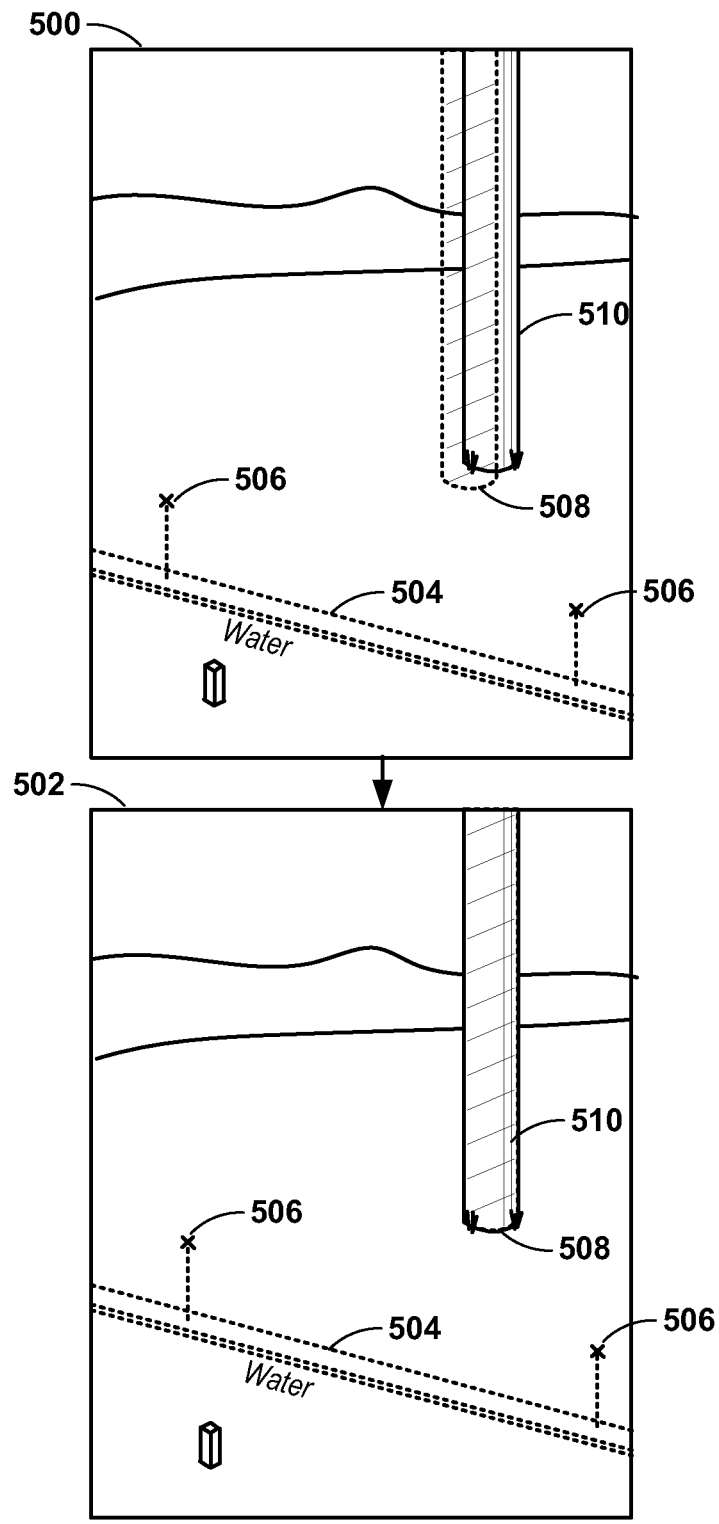

In some scenarios, the visualizations may provide the user a rough estimate of where objects are located, and other mechanisms, such as 2-D "look-down" display showing objects directly underfoot, may be used for marking. Other output devices may also be employed to indicate subsurface object location, such as a stereophonic tone that varies in pitch, direction, or the like when the user is over a structure and moves away from a centerline of the structure. In addition, various other features may enable greatly increasing the locational accuracy of such a device by way of existing reference points. One example of this is shown in application screens 500, 502 in FIG. 5 according to an embodiment of the invention.

In screen 500, a view of a site includes a representation 504 of an underground structure as previously described. This object 504 also includes surface markers 506. Alternatively, the object 504 itself may be rendered as a projection onto the ground surface, obviating the need for markers 506. Assuming the device that is creating the view 500 has accurately measured its own location, placing markers on the surface at 506 should correspond to the underground object represented by 504. The location and/or geometry of these objects 504, 506 may be obtained via a GIS database service as described above. The database service may also include location/geometry data of an above-ground reference object, here shown as object 508 that corresponds to a utility pole 510 seen in the view 500.

By overlaying the reference object 508 in the view 500, the user can visualize the amount of error by comparing object 508 to the image of the actual object 510 in the view. Further, this error can be corrected by shifting (e.g., through user input, pattern recognition, etc.) the location of the virtual objects 504, 506, 508 as a group until virtual object 508 corresponds to viewed object 510, as seen in screen 502. Thereafter, the user may make marks corresponding to points 506 (e.g., by pointing to the marks 506 using a laser pointer and having an assistant mark the spot).

It will be appreciated that a number of variations on these error correction features are possible. For example, in the illustrated example, the virtual and real objects 508, 510 may be aligned based on the intersection of object 510 with the ground, but this may not always be so easily determined (e.g., the intersection with the ground may be covered by foliage). Further, a surface level reference point may not always be sufficiently accurate, as terrain can change over time due to landscaping, erosion, etc. Accordingly, a reference spot (e.g., reflector) may be placed on the object 510 at an accurately measured point and a corresponding mark on the virtual object 508 may be used to line up the two. In other cases, the reference spot may be an emitter/transponder that allows the user device to automatically make corrections such as seen in screen 502, and may also be used (e.g., via a range finder) to make other corrections to device location and orientation estimates.

Although the object 510 is shown as relatively fixed and immovable, other objects may also be used for this purpose. For example, a static or active device can be accurately placed (e.g., via prepositioning or accurate self-measurement) at one or more spots and be used to improve the locational and orientation accuracy of handheld devices used for visualizing, measuring, and other activities described herein that are enabled by devices and applications according to embodiments of the invention.

In another variation, if the visualization of the device as shown, e.g., in screen 502 has a significant accuracy and confidence level, the visualizations themselves may be used to correct deficiencies of GIS data in the database. For example, an excavation may reveal an underground object whose location differs from what is seen in the display window of device 100. This composite view (e.g., showing both the virtual and actual objects together) could be used to form a report that shows the discrepancy, and may include other measured data such as location, distances, image captures, etc. Data in such a report could be immediately cause GIS data to be modified in the database, and/or result in a further on-site analysis to be undertaken by a responsible party. In other cases, the GIS database may not include depth information, and this composite view could be used to add such data for future reference. It will be appreciated that alternate means of locating and/or correcting the location of subsurface objects are known, and could be used instead of or in addition to the illustrated visualizations.

As described above, a mobile device 100 may be utilized to retrieve GIS data from a database service and utilize the GIS data for purposes such as indicating to a user of the device 100 about locations of objects that are subsurface, non-physical, or otherwise not visible to the naked eye. Details of a mobile device 100 according to an example embodiment of the invention are described in relation to the block diagram of FIG. 6. The device 100 may include an apparatus 600 having conventional computing hardware components 601 known in the art. For example, the apparatus 600 may include one or more processors 602, memory 604 (both volatile and non-volatile), and input/output (I/O) circuitry 606. The memory 604 and I/O circuits 606 are coupled to the processor 602 as is known in the art, e.g., through respective data transfer busses and interfaces.

The computing components 601 may interact with the outside world via various interfaces. These interfaces may include a network interface 608, sensor interface 610, user interface 612, and data storage interface 614. These interfaces may include data and power transfer circuitry, as well as software components (e.g., drivers) that enable various internal or external devices to interact with an operating system of the device 100. The network interface 608 enables wired or wireless communications with other computers and devices that collectively form one or more networks 616, including the Internet and other public/private networks. As will be discussed in greater detail below, the networks 616 may facilitate access to services such as a GIS service 618, government service 620, and other services, such as shown by way of example, a social networking service 622 that enables person-to-person interactions.

The sensor interface 610 provides access to external or built in sensing devices 624, such as a location and orientation sensors 626, 628. These sensors 626, 628 may include GPS receivers/processors, accelerometers, electronic compasses, and the like, that enable the device 100 to determine its location and orientation in a global coordinate system. A sensor such as a proximity/range sensor 630 may provide location and orientation data relative to a local coordinate system, e.g., distance from the device 100 itself. A camera sensor 632, such as a charge-coupled detector (CCD) may also provide some manner of range finding ability, as well as providing local image producing capabilities discussed herein.

The user interface 612 may receive local or remote user inputs, and provides local or remote user outputs, e.g., via user interface hardware 634. The hardware 634 includes user interface devices known in the art, such as a display 636 and keypad 638. Other user interface hardware may include, but is not limited to, speakers, microphones, switches, touch pad/screen, pointing devices, trackball, joystick, vibration generators, lights, etc.

The storage interface 614 provides a mechanism for interacting with local devices that persistently store data, e.g., computer readable media 640. For example, programs 642 according to embodiments of the invention may be installed on the apparatus 600 from media 640 via the interface 614. The network interface 608 may be put to similar use. The programs 642 may include software for running the apparatus 600 including operating systems, services, applications, drivers, configurations, static data, and the like.

In one example, the programs 642 include a GIS interface component 644 that enables interacting with GIS service 618, e.g., via networks 616. For example, the GIS component 644 may be able to determine and validate a user identity of the apparatus 600. The identity may be associated with the GIS service 618, e.g., tied to a paid subscription to the service. The identity may be used to regulate access to the GIS database based on factors such as service level, site location, user location, security level, etc. The GIS component 644 may also handle other aspects interacting with the service 618, such as defining formats and protocols, data integrity, security/encryption, bandwidth management, etc.

The programs 642 may also include an overlay component 646 that manages rendering/display of GIS data received via the GIS component 644. For example, as shown and described in relation to FIGS. 1-5, the component 642 may be capable of determining location/orientation via sensor hardware 624. This sensor data may be used to determine a virtual space currently associated with device 100, and this may be used to obtain GIS data of interest via the GIS interface 644. The GIS data obtained this way may be used to determine where any objects (e.g., subsurface structures) may be located in the local coordinates of the virtual space. Accordingly, geometric shapes can be formed that correspond to location and/or geometry of these objects, and these geometric shapes can be rendered to the user, e.g., overlaid on a camera image being shown on display 638.

In one embodiment (also described in more detail in the discussion of FIG. 7), the device 100 may offload some or all processing of the overlays component 646 to a network server, e.g., GIS service 618 via GIS interface 644. For example, the device 100 may gather sensor data via interface 610 that describes a current location and orientation of a device of interest. This data may be in a globally relevant format (e.g., latitude, longitude, altitude, bearing, and/or azimuth) and may include other data, e.g., media captured via camera 632. This can be sent to the GIS service 618 via interface 644, and the service 618 can provide the geometric calculations and/or image compositing. In such a case, the GIS interface 644 may receive processed data for rendering from the service 618, such as a composite image that can be rendered on display 636. In another example, the service 618 may return geometric shape data that describes virtual objects, and the actual rendering and/or overlaying of those objects occurs locally on the device 100.

Another example of programs 642 that may be run on the apparatus 600 includes a reports component 648. The reports component 648 can distill various data from other components (e.g., GIS interface 644 and overlay component 646) in order to present human readable documents usable for a particular purpose. One such purpose was described in relation to FIG. 4, where a report 420 was showed that may be used in one-call type applications. In such a case, the reports component 648 may interface with government service 620 that manages the submission of such reports.

In another example, reports component 648 may format data as network content, e.g., web content usable by social network 622. For example, various contractors and subcontractors may maintain a private or public log of project data which can be hosted by a social network service 622. In other cases, such a social network 622 may be used to feed data of interest to government service 620 and/or GIS service 618. Other data formed by the reports component 648 may include: CAD models that describe a site and associated GIS data; construction records that can be included with a real estate database (e.g., record improvements which raise a property's value); prepare request for quotes or other business services; etc.

Figure 6:
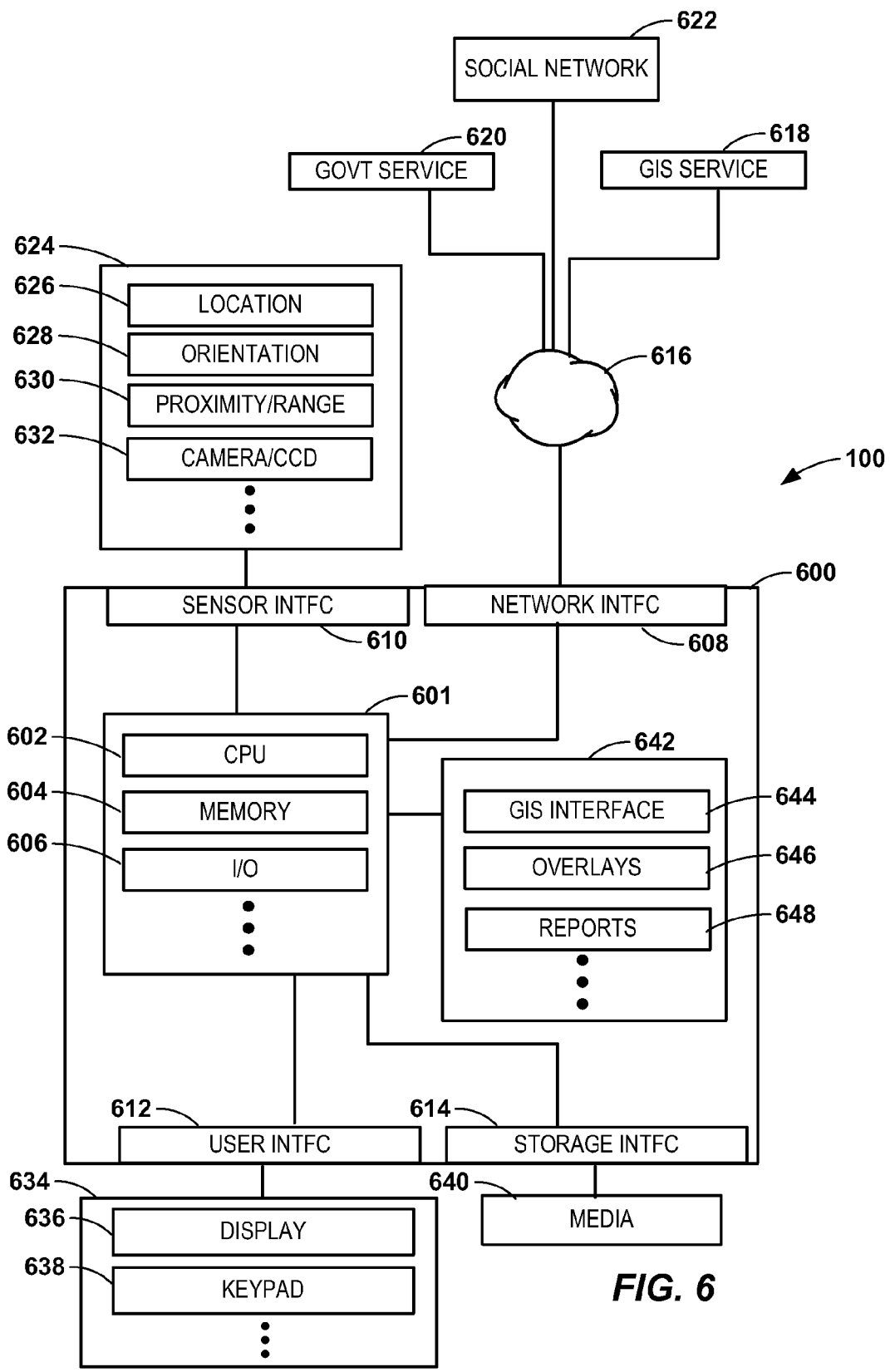
FIG. 6 is a block diagram illustrating a mobile device according to an example embodiment of the invention.
Figure 7:
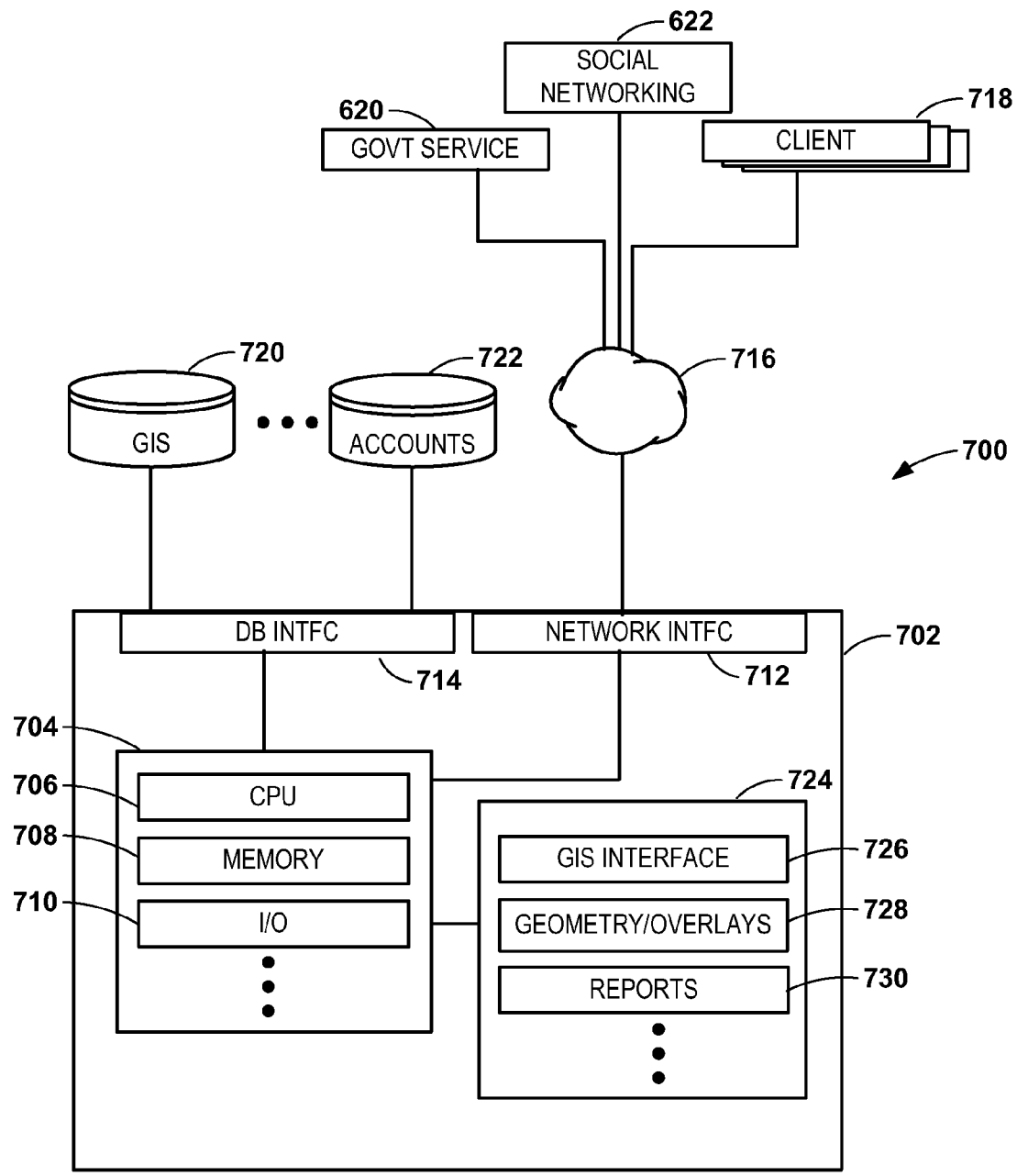
FIG. 7 is a block diagram illustrating a service arrangement according to an example embodiment of the invention.

In reference now to FIG. 7, a block diagram illustrates a service arrangement 700 according to an embodiment of the invention. The arrangement 700 may be configured to provide GIS-related services, such as GIS service 618 described in relation to in FIG. 6. The arrangement 700 may include an apparatus 702 having conventional computing hardware components 704 known in the art. For example, the apparatus 702 may include one or more processors 706, memory 708 (both volatile and non-volatile), and input/output (I/O) circuitry 710. The memory 708 and I/O circuits 710 are coupled to the processor 706 as is known in the art, e.g., through respective data transfer busses and interfaces.

The apparatus 702 may interact with other components of the arrangement via various interfaces. These interfaces may include a network interface 712 and database interface 714. The network interface 712 enables wired or wireless communications with other computers and devices that collectively form one or more networks 716, including the Internet and other public/private networks. The networks 716 may facilitate access to entities such as client devices 718 (e.g., mobile device 100), and government and social network services 620, 622 such as shown and described in relation to FIG. 6.

Generally, the network interface 712 provides clients 718 the ability to request at least GIS data that describes location and/or geometry of subsurface structures and the like. Various functions of device 100 as described in relation to FIG. 6 may include the ability to generate reports and other composite documents that may be submitted to government and social network services 620, 622. It will be appreciated that these actions may also be taken in whole or in part via service arrangement 700, e.g., using reports component 730. Reports component 730 may gather data from client devices 718 and via database interface 714, prepare documents in a particular format, and submit documents to other entities, including government and social network services 620, 622 and/or to the client devices 718 themselves.

The database interface 714 allow the apparatus 702 to access persistent data from local or remote databases, here shown as GIS database 720 and accounts database 722. Generally, the GIS database 720 includes geographical data that describes subsurface structures and other entities described herein. The GIS database 720 may be indexed for efficient lookups based on location, and may include other features that allow the database to operate efficiently with geographically described data. The accounts database 722 may include data related to users of client devices 718, and also may relate to accounts with other entities, such as government and social networking services 620, 622.

The apparatus 702 according to embodiments of the invention may execute programs 724 to perform various operations described herein. Such programs 724 may be installed on the apparatus 702, e.g., from computer-readable media (not shown) and or the network interface 712. The programs 724 may include software for running the apparatus 702 including operating systems, services, applications, drivers, configurations, static data, and the like. In one example, the programs 724 include a GIS interface component 726 that enables interacting with clients 718, e.g., via networks 716.

For example, the GIS component 726 may be able to determine and validate a user identity of a client device 718 via accounts database 722. The identity may be associated access to the GIS database 720, e.g., tied to a paid subscription to the access the database 720. The identity data may be used to regulate access to the GIS database based on factors such as service level, site location, user location, security level, etc. The GIS component 726 may also handle other aspects interacting with the clients 718, such as defining formats and protocols, data integrity, security/encryption, bandwidth management, etc.

As described in relation to FIG. 6, client devices 718 may utilize globally defined GIS data to construct virtual objects in a local coordinate system for purposes such as rendering the objects to a user via a local device. Some or all of this processing may also be performed by clients 718 or by the service arrangement 700, as indicated by geometry/overlay component 728. This component 728 may, for example, receive geographically referenced location and orientation data from clients 718, such as data that describes a geographic location and orientation of a camera view. Base on this data, the component 728 may lookup relevant objects for that view from the GIS database 720, form geometry usable in a local coordinate system of the client devices 718 (e.g., angle x, y, z-offsets relative to a center point of a camera view and/or display) and send at least this geometry data to the clients 718. This geometry data may be combined with other image data (e.g., still picture or video captured from a camera) either at the client device 718 or at the service arrangement 700. The reports component 730 may also provide functions similar to what has been previously described being performed via mobile device 100. For example, the reports component 730 may receive GIS and image data from client devices 718 and form documents usable by entities such as government and social networking services 620, 622.

Figure 8:
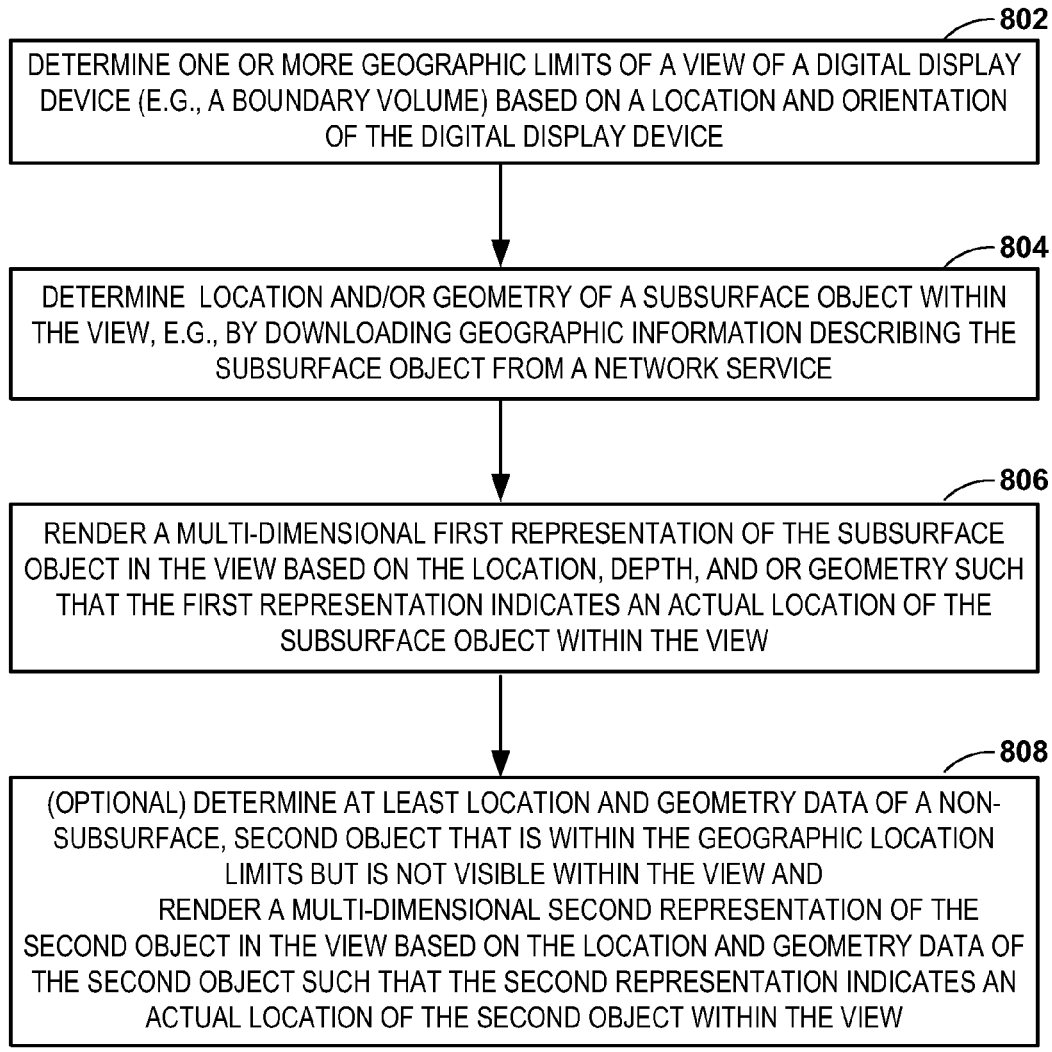
FIGS. 8-9 are flowcharts illustrating methods/processes according to example embodiments of the invention.

In reference now to FIG. 8, a flowchart illustrates an example method/procedure according to an embodiment of the invention. The procedure involves determining 802 one or more geographic limits of a view of a digital display device based on a location and orientation of the digital display device. These limits may include a boundary volume, and/or other locally or globally referenced location/position data from which a boundary may be derived. Also, some combination of location, depth, and geometry of a subsurface object within the view may be determined 804. This data may be downloaded from a GIS network service, copied onto computer readable medium, locally measured, etc.

A multi-dimensional first representation of the subsurface object is rendered 806 in the view based on the location, depth, and/or geometry such that the first representation indicates an actual location of the subsurface object within the view. In some cases, a non-subsurface object not visible in the view (e.g., property line, construction/excavation boundary, etc.) may be determined 808 and rendered within the view as well.

Figure 9:
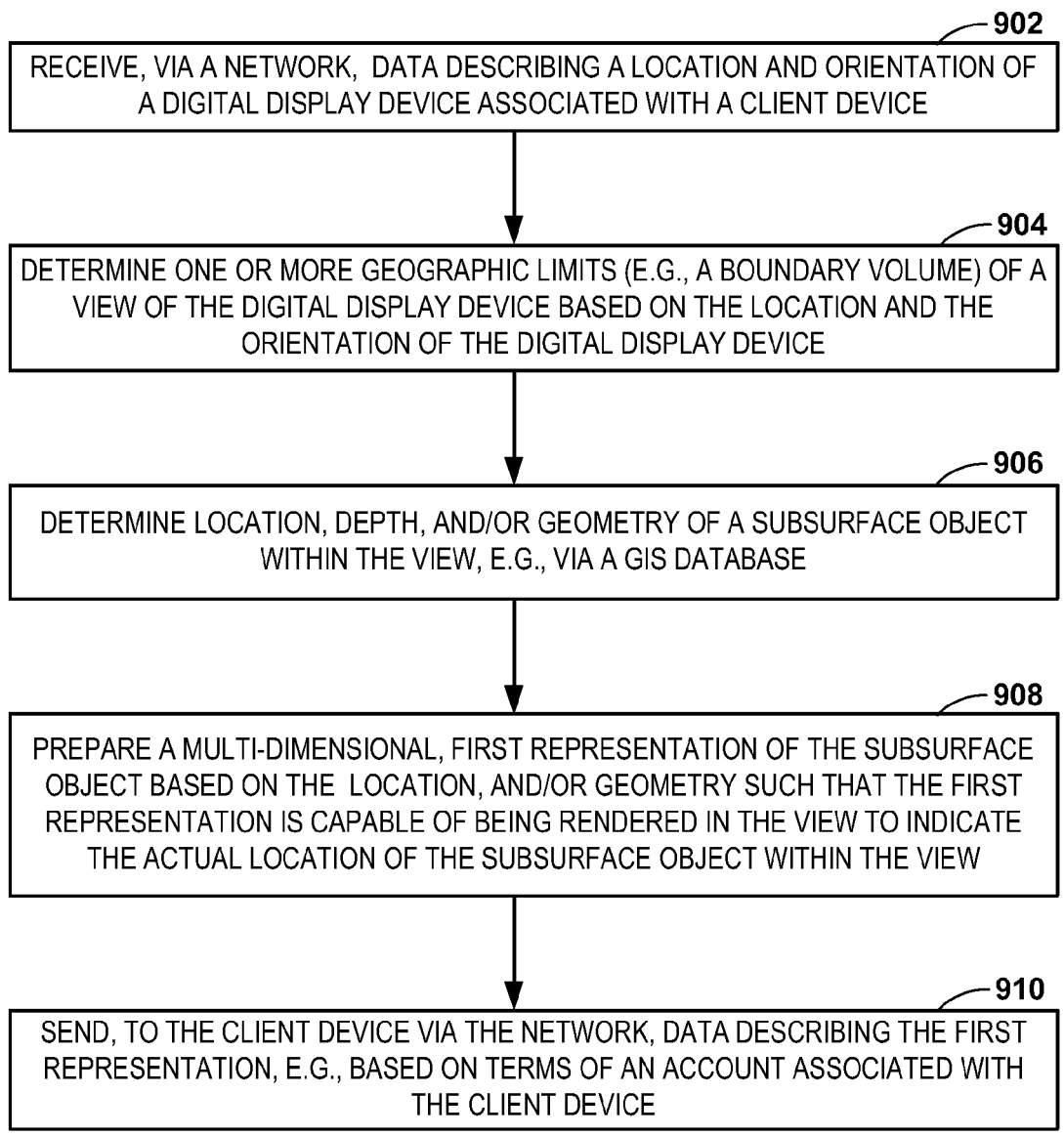

In reference now to FIG. 9, a flowchart illustrates another example method/procedure according to an embodiment of the invention. Data describing a location and orientation of a digital display device associated with a client device is received 902 via a network. This received data may include, for example, parameters that describe a view associated with one or more of a camera or display coupled to the client device. One or more geographic limits of a view of the digital display device are determined 904 based on the location and the orientation of the digital display device.

A location, depth, and/or geometry of a subsurface object within the view are determined 906. This may be retrieved, for example, from a GIS database using the geographical limits to filter/index the results. A multi-dimensional, first representation of the subsurface object is prepared 908 based on the location and depth such that the first representation is capable of being rendered in the view to indicate the actual location of the subsurface object within the view. Data describing the first representation is sent 910 to the client device via the network, e.g., based on terms of an account associated with the client device.

Hardware, firmware, software or a combination thereof may be used to perform the various functions and operations described herein. Articles of manufacture encompassing code to carry out functions associated with the present invention are intended to encompass a computer program that can be stored on any computer-readable storage medium. From the description provided herein, those skilled in the art will be readily able to combine software created as described with appropriate general purpose or special purpose computer hardware to create a system, apparatus, and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method implemented by a discrete digital display device, comprising:
   determining one or more geographic limits of a view of the digital display device based on a location and orientation of the digital display device, the one or more geographic limits defining a volume less than the entirety of the view and comprising space above and below a visible horizon of the view;
   determining at least a location and a depth of a subsurface object within the volume;
   rendering a multi-dimensional first representation of the subsurface object in the view based on the location and depth such that the first representation indicates an actual below-ground location of the subsurface object within the view;
   determining a location of a visible object that is within the volume of the view of the digital display device;
   correcting a position error of the first representation of the subsurface object using the visible object location; and
   displaying the visible object and the position error corrected first representation of the subsurface object in the view.

2. The method of claim 1, wherein the multi-dimensional first representation comprises a three-dimensional projection of the below-ground object onto a ground surface.

3. The method of claim 1, wherein determining the visible object location further comprises:
   determining second location and geometry data of the visible object;
   rendering a three-dimensional second representation of the visible object in the view based on the second location and geometry data such that the second representation is overlaid on the visible object within the view;
   detecting a correspondence between the second representation and the visible object; and
   correcting the position error of the first representation based on the correspondence.

4. The method of claim 1, further comprising determining geometry data of the subsurface object, wherein the multi-dimensional first representation comprises a three-dimensional representation that is rendered based on the geometry data.

5. The method of claim 1, further comprising:
   determining at least location and geometry data of a non-subsurface, second object that is within the geographic location limits but is not visible within the view; and
   rendering a multi-dimensional second representation of the second object in the view based on the location and geometry data of the second object such that the second representation indicates an actual location of the second object within the view.

6. The method of claim 5, wherein the second object comprises one or more of a property boundary, a future construction boundary, and an excavation boundary.

7. The method of claim 1, wherein determining at least the location and the depth of the subsurface object within the volume comprises downloading geographic information describing the subsurface object from a network service.

8. The method of claim 7, further comprising establishing an account with the network service, and wherein access to the geographic information is governed based on terms of the account.

9. The method of claim 1, wherein the one or more geographic limits comprise a boundary volume.

10. A non-transitory computer readable storage medium configured with instructions operable by a processor to cause an apparatus to perform the steps of the method of claim 1.

11. A discrete digital display device, comprising:
    one or more sensors capable of determining a location and orientation of the digital display device;
    memory; and
    a processor coupled to the memory, wherein the memory includes instructions operable by the processor to cause the apparatus to:
      determine one or more geographic limits of a view of the digital display device based on the location and the orientation of the digital display device, the one or more geographic limits defining a volume less than the entirety of the view and comprising space above and below a visible horizon of the view;
      determine at least location of a subsurface object within the volume;
      prepare a multi-dimensional first representation of the subsurface object based on the location and depth such that the first representation is capable of being rendered in the view to indicate the actual location of the subsurface object within the view;
      determine a location of a visible object that is within the volume of the view of the digital display device;
      correct a position error of the first representation of the subsurface object using the visible object location; and
      display the visible object and the position error corrected first representation of the subsurface object in the view.

12. The apparatus of claim 11, wherein the multi-dimensional first representation comprises a three-dimensional projection of the below-ground object onto a ground surface.

13. The apparatus of claim 11, further comprising a display, and wherein the processor further causes the apparatus to render the multi-dimensional first representation and the visible object in the view via the display.

14. The apparatus of claim 11, wherein the processor further causes the apparatus to:
    determine second location and geometry data of the visible object;
    render a three-dimensional second representation of the visible object based on the second location and geometry data such that the second representation is overlaid on the visible object within the view;
    detect a correspondence between the second representation and the visible object; and
    correct the position error of the first representation based on the correspondence.

15. The apparatus of claim 11, wherein the processor further causes the apparatus to determine geometry data of the subsurface object, wherein the multi-dimensional first representation comprises a three-dimensional representation that is rendered based the geometry data.

16. The apparatus of claim 11, wherein the processor further causes the apparatus to:
    determine at least location and geometry data of a second object that is within the geographic location limits but is not visible within the view; and
    prepare a multi-dimensional second representation of the second object based on the location and geometry data of the second object such that the second representation is capable of being rendered in the view to indicate an actual location of the second object within the view.

17. The apparatus of claim 16, wherein the second object comprises one or more of a property boundary, a future construction boundary, and an excavation boundary.

18. The apparatus of claim 11, wherein the apparatus further comprises a network interface, and wherein the processor further causes the apparatus to download geographic information describing the subsurface object from a network service via the network interface.

19. The apparatus of claim 18, wherein the processor further causes the apparatus to determine an account established with the network service, wherein access to the geographic information is governed based on terms of the account.

20. The apparatus of claim 11, wherein the one or more geographic limits comprise a boundary volume.

21. An apparatus comprising:
    a central server comprising:
      a network interface capable of communicating with one more client devices;
      memory; and
      a processor coupled to the memory, wherein the memory includes instructions operable by the processor to cause the apparatus to:
        receive, via the network interface, data describing a location and orientation of a digital display device associated with a selected one of the client devices;
        determine one or more geographic limits of a view of the digital display device based on the location and the orientation of the digital display device, the one or more geographic limits defining a volume less than the entirety of the view and comprising space above and below a visible horizon of the view;
        determine at least a location of a subsurface object within the volume;
        prepare a multi-dimensional, first representation of the subsurface object based on the location and depth such that the first representation is capable of being rendered in the view to indicate the actual location of the subsurface object within the view;
        correct a position error of the first representation of the subsurface object using a location of a visible object that is within the volume of the view of the digital display device; and send, via the network interface, data describing the position error corrected first representation and the visible object to the selected client device, the data comprising data for displaying the visible object and the position error corrected first representation of the subsurface object by the digital display device associated with the selected client device.

22. The apparatus of claim 21, wherein the processor further causes the apparatus to determine geometry data of the subsurface object, wherein the multi-dimensional first representation comprises a three-dimensional representation based the geometry data.

23. The apparatus of claim 21, wherein the processor further causes the apparatus to:
determine an account associated with the selected client device; and
govern access to the geographic information based on terms of the account.

24. The apparatus of claim 21, wherein the one or more geographic limits comprise a boundary volume.

25. A method comprising:
receiving, at a central server via a network, data describing a location and orientation of a digital display device associated with a client device;
determining, at the central server, one or more geographic limits of a view of the digital display device based on the location and the orientation of the digital display device, the one or more geographic limits defining a volume less than the entirety of the view and comprising space above and below a visible horizon of the view;
determining, at the central server, at least a location of a subsurface object within the view;
preparing, at the central server, a multi-dimensional, first representation of the subsurface object based on the location and depth such that the first representation is capable of being rendered in the view to indicate the actual location of the subsurface object within the view;
correcting, at the central server, a position error of the first representation of the subsurface object using a location of a visible object that is within the volume of the view of the digital display device; and
sending, from the central server to the client device via the network, data describing the position error corrected first representation and the visible object, the data comprising data for displaying the visible object and the position error corrected first representation of the subsurface object by the digital display device associated with the client device.

26. The method of claim 25, further comprising determining geometry data of the subsurface object, wherein the multi-dimensional first representation comprises a three-dimensional representation based the geometry data.

27. A non-transitory computer readable storage medium configured with instructions operable by a processor to cause an apparatus to perform the steps of the method of claim 25.

* * * * *